United States Patent Office 2,768,161
Patented Oct. 23, 1956

2,768,161

METHOD FOR THE MANUFACTURE OF MIXED CELLULOSE ESTERS OF LOWER FATTY ACIDS AND DICARBOXYLIC ACIDS

Carl J. Malm and Carlton L. Crane, Rochester, N. Y., assignors to Eastman Kodak Company, Rochester, N. Y., a corporation of New Jersey No Drawing. Application September 25, 1952,
Serial No. 311,552

3 Claims. (Cl. 260—225)

Our invention relates to a method of preparing mixed cellulose esters of lower fatty acids and dicarboxylic acids, such as cellulose acetate phthalate, by first preparing cellulose acetate hydrolyzing the same, converting the mass to an anhydrous condition, adding dicarboxylic acid anhydride and sodium acetate, and reacting upon the cellulose ester until a substantial proportion of dicarboxylic acid groups are introduced therein.

Three methods have ordinarily been regarded as suitable for the preparation of dicarboxylic acid esters of lower fatty acid esters of cellulose: (1) reacting upon a cellulose ester with a dicarboxylic acid anhydride in an organic solvent at an elevated temperature, as illustrated by the method described and claimed in U. S. Patent No. 2,126,460 of Genung; (2) reacting upon a cellulose ester with a dicarboxylic acid anhydride and a tertiary amine, such as pyridine, as described in Malm and Waring Patent 2,093,462; and (3) reacting upon a cellulose ester with a dicarboxylic acid anhydride in glacial acetic acid in the presence of a basic catalyst, such as sodium acetate, as described and claimed in U. S. application Serial No. 272,697 of Hiatt, Mench and Emerson, filed February 20, 1952. All of these methods have involved isolation of the cellulose ester from the reaction mass in which it was prepared and then reacting upon the so-separated ester with a dicarboxylic acid anhydride. In these methods to obtain a product having a considerable proportion of dicarboxylic acid radical so as to impart alkali solubility thereto and still get a reasonable viscosity and good physical properties, it has been necessary to hydrolyze the cellulose ester to a point where considerable hydroxyl was present. For instance, in the case of cellulose acetate it has ordinarily been desirable in these methods to hydrolyze the cellulose acetate to an acetyl content of less than 34% in order to obtain dicarboxylic acid esters thereof having a substantial content of dicarboxylic acid radical therein. Precipitation of low acyl cellulose esters of that type has had to be carried out in a low acid concentration, such as below 10% strength acid, and because of this the recovery of the acetic acid resulting from such precipitation is expensive and contributes to an increased cost of the cellulose acetate or other ester used as the starting material in preparing a dicarboxylic acid ester thereof. It has been suggested in the prior art that possibly dicarboxylic acid esters of cellulose acetate could be prepared by carrying out phthalylation, for instance, in a bath which also hydrolyzes the cellulose ester, this constituting a modification of the method described in Blanchard and Crane Patent No. 2,183,982. However, such modification as exemplified in Seymour and White U. S. Patent No. 2,285,536 results in a process in which but a small amount of phthalyl can be introduced, due to the fact that the phthalylation is carried out under aqueous conditions. The presence of water in a phthalylation reaction combines with phthalic anhydride and thereby decreases its effectiveness in imparting a phthalyl content to a cellulose ester unless extremely severe temperature conditions are used. Therefore, the preparation of cellulose acetate phthalate or like esters by methods in accordance with such procedure have never shown themselves to be of practical value.

One object of our invention is to provide a method for preparing mixed cellulose esters of lower fatty acids and dicarboxylic acids in which the isolation of the starting lower fatty acid ester of cellulose from the reaction mass in which it was prepared is unnecessary prior to reacting thereupon with a dicarboxylic acid anhydride. Another object of our invention is to provide a method of preparing dicarboxylic acid esters in which the reaction is carried out under anhydrous conditions. A further object of our invention is to provide a method for preparing dicarboxylic acid esters of lower fatty acid esters of cellulose in which a substantial percentage of dicarboxylic acid radical may be imparted thereto. Other objects of our invention will appear herein.

We have found that a cellulose acetate phthalate of good physical properties can be prepared without isolating the starting hydrolyzed cellulose ester from the reaction mass in which it was prepared by a procedure in which an excess of alkali metal acetate is added which serves both to neutralize the catalyst employed for hydrolyzing the cellulose ester and to catalyze the reaction between the dicarboxylic acid anhydride and the cellulose ester in the lower fatty acid present. The alkali metal acetate may be added directly to the hydrolysis mixture containing the lower fatty acid ester of cellulose or the alkali metal acetate may be added in the form of the salt of a weak acid, such as sodium or potassium carbonate, or even in the form of the hydroxide whereby alkali metal acetate is formed in the mass. However, in view of the fact that the alkali metal acetate is wanted and the formation thereof in situ in the mass may form additional water, it is ordinarily desirable to add the alkali metal acetate directly thereto. After the hydrolysis catalyst neutralizing alkali metal acetate has been supplied to the hydrolyzed mass of the lower fatty acid ester of cellulose, there is then added a dicarboxylic acid anhydride to esterify the cellulose ester, plus a sufficient amount of acetic anhydride to react with the water present in the hydrolysis mixture. When the mass has been converted to the proper form, the esterification procedure takes place in accordance with the method designated previously as method 3.

In its broadest aspects our invention comprises first preparing cellulose acetate or a mixed ester, i. e., cellulose acetate propionate or cellulose acetate butyrate by reacting upon cellulose with acetic anhydride and acetic acid, or if a mixed ester is to be obtained, with some propionyl or butyryl also present, using a sulfuric acid catalyst to promote the reaction. After the cellulose has been esterified it is then subjected to hydrolysis, induced by adding aqueous acetic acid to the mass. This hydrolysis may be carried out in any conventional manner, such as by diluting the mass to a lower fatty acid concentration of 80–95%, and allowing the mass to stand for the desired time at an elevated temperature, such as 100–150° F. The amount of hydrolysis to be imparted to the acetyl cellulose is selected in accordance with the amount of dicarboxylic acid radical which is to be introduced therein. For instance, if a substantial content of dicarboxylic acid radical in the final product is desired, it is desirable that the hydrolysis of the acetyl cellulose be to a point where the acetyl content thereof is as low as 35% or less. This is particularly true where the preparation of an alkali-soluble final product is desired. If, on the other hand, a lesser percentage of dicarboxylic acid radical is desired in the final product, the amount of hydrolysis need not be as great.

After the hydrolysis has been carried out to the desired degree, there is then added to the mass an alkali metal acetate or an alkali metal acetate former. This addition of alkali metal acetate serves 2 purposes: (1) neutralization of the sulfuric acid catalyst which is present in the mass as a result of the first esterification step, and (2) catalyzation of the esterification of the hydrolyzed acetyl cellulose with dicarboxylic acid anhydride. If, desired, this addition of alkali metal acetate to the mass can be carried out in 2 or more steps. For instance, part of the alkali metal acetate may be added prior to the completion of the desired hydrolysis, and after the completion of the hydrolysis and the neutralization of the sulfuric acid catalyst, dicarboxylic acid anhydride and acetic anhydride may be added, with possibly further alkali metal acetate, if that already present is deemed to be insufficient to catalyze the esterification by the dicarboxylic acid anhydride. The acetic anhydride is added for the purpose of destroying any water which may be present to assure anhydrous conditions. After the addition of the dicarboxylic acid anhydride, the mass is then maintained at a temperature within the range of 140–212° F. until the desired dicarboxylic acid radical content has been introduced into the cellulose ester.

In the hydrolysis of the acetyl cellulose, it is preferred that at least 5% of water be present, based on the liquid in the bath. In any event, enough water should be introduced to promote hydrolysis of the cellulose ester, the amount of water necessary being governed by various conditions, such as the liquid: solid ratio in the bath, the temperature at which the hydrolysis is carried out, and the desired acetyl content of the acetate. The upper limit of the percentage of water present for hydrolysis is limited only by the percentage at which precipitation of the cellulose ester is avoided.

In the preparation of the lower fatty acid ester of cellulose, the acyl content of that ester should consist predominantly of acetyl, although, if desired, some propionyl or butyryl may be introduced in the esterification mass, thereby contributing those groups to the cellulose ester which results. However, unless there is some reason to the contrary, it is preferred that the cellulose ester initially prepared be primarily a cellulose acetate. If propionyl or butyryl are also introduced, it is preferable that the propionyl and butyryl be not more than 20% of the total acyl content of the lower fatty acid ester of cellulose initially prepared.

Although our invention is primarily directed to the preparation of cellulose acetate phthalate, this ester at the present time being the most important commercially of the cellulose ester carboxylates, our process is designed to prepare dicarboxylic acid esters of acetyl cellulose generally. For instance, instead of using phthalic anhydride, esters may be prepared by using other dicarboxylic anhydrides, such as succinic or maleic anhydride or a mixture of dicarboxylic acid anhydrides. Also, our invention is particularly useful for the preparing of alkali-soluble cellulose esters in which at least a 15% phthalyl content or higher, or its equivalent in other dicarboxylic acid radical content, is desirable. In the making of esters of this type, it is desirable that the amount of phthalic or other dicarboxylic acid anhydride employed be at least .35 part per part of cellulose. In esterifying cellulose with dicarboxylic acid anhydride in accordance with our invention, some of the alkali metal acetate neutralizes the sulfuric acid present in the hydrolysis mass, and the remainder of the alkali metal acetate catalyzes the esterification of the cellulose ester with the dicarboxylic acid anhydride. It is desirable that from .1 part up to 3 parts of sodium acetate be present in the esterification mass per part of cellulose over and above that used for neutralizing sulfuric acid for the esterification of the cellulose ester with the dicarboxylic acid anhydride. Obviously, if small percentages of phthalyl, succinyl or maleyl are desired in the cellulose ester product, the proportions of the reacting anhydride and the catalyst may be kept to a minimum.

The following examples illustrate our invention:

*Example 1*

9 lbs. of acetylation type cotton linters were mixed in a sigma bladed mixer with 40 lbs. of acetic acid for 15 minutes at 115° F. There was then added thereto a mixture of 28.8 cc. of sulfuric acid and .1 lb. of acetic acid, and the mixing was continued for 5 minutes at 115° F., whereupon the mass was cooled to 70° F. 22.1 lbs. of acetic anhydride cooled to 36° F. were added to the mixer and the mass was kept for 30 minutes at a temperature between 60 and 75° F. Thereupon a mixture of 134.7 cc. of sulfuric acid and .4 lb. of acetic acid were added, and reaction occurred over a period of 40 minutes, the mass reaching a maximum temperature of 110° F. After mixing for 20 minutes, a clear viscous dope was obtained.

A mixture of 9.1 lbs. of water and 5.9 lbs. of acetic acid, heated to 160° F., was slowly added to the reaction mixture during which the temperature thereof was increased to 140° F. Hydrolysis of the cellulose acetate was carried out for 10 hours at 140° F., whereupon the temperature was reduced to 100° F. 119 grams of anhydrous sodium acetate were then added, and the hydrolysis was continued at 100° F. until the acetyl content of the cellulose acetate was 32.4%, which hydrolysis required 15 hours.

13 lbs. of anhydrous sodium acetate were added to the mass, followed by the addition of 26 lbs. of phthalic anhydride, and 15 minutes later by the addition of 44 lbs. of 97% acetic anhydride. The mixture was heated to 170° F. and maintained at that temperature for 5 hours. At the end of this time a cellulose acetate phthalate was obtained which was separated from the reaction mass by precipitation in 30% aqueous acetic acid. The precipitate was washed by means of 15 one-hour changes of distilled water at 130° F. and dried at 130° F. The cellulose acetate phthalate obtained had an acetyl content of 26% and a phthalyl content of 26%, which product was readily soluble in both dilute sodium carbonate and in ammonia water. The product obtained was found to have good film-forming properties.

*Example 2*

9.3 parts of undried acetylation grade cotton linters were placed in a sigma bladed mixer, together with 40 parts of acetic acid. The mixture was agitated and the temperature was raised to 101° F. over a period of 15 minutes. A mixture consisting of 0.116 part of 94.7% sulfuric acid and 1/10 part of glacial acetic acid were added to the mixer, and the mass was agitated for 5 minutes at 103° F. 22.1 parts of 97% acetic anhydride, pre-cooled to 30° F., were then added to the mixer. The mixture was stirred for 30 minutes, during which time the temperature was reduced to 59° F. A mixture consisting of 0.546 part of 94.7% sulfuric acid and 0.5 part of acetic acid was added to the mixture, and the temperature thereof was allowed to rise to 112° F. over 4 hours. 10 parts of 49% acetic acid, heated to 150–160° F., were then added to the mixer over 30 minutes, and the temperature of the mass rose to 144° F. 0.26 part of sodium acetate were added to the mass, and the temperature thereof was gradually reduced from 144° F. to 130° F. The reaction mass was maintained at a temperature of 130° F. for 15 hours. 0.13 part of sodium acetate were then stirred into the solution, and the mixing thereof was continued until a test sample showed the cellulose ester therein had an acetyl content of 32%. 15 parts of the reaction solution were placed in a sigma bladed reactor and treated with 4.6 parts of sodium acetate and 2.3 parts of phthalic anhydride. The solution was cooled while agitating for 15 minutes, and during this time 3.8 parts of 97% acetic anhydride were added to the solution. The temperature of the solution was then raised to 145° F. over a period of 2 hours; then to 147° F. over 3 hours. The reaction mass thus obtained was precipitated into distilled water, washed free from acid with distilled water and dried at 120° F. The product obtained contained 25.3% phthalyl.

We claim:

1. A method of preparing mixed cellulose esters of lower fatty acids and dicarboxylic acids which comprises esterifying cellulose with an esterification bath comprising lower fatty acid anhydride and sulfuric acid catalyst, hydrolyzing the cellulose ester thus obtained while still in solution, with aqueous acid and then imparting dicarboxylic acid groups to the cellulose ester which comprises adding sufficient lower fatty acid anhydride to convert the hydrolyzed cellulose ester mass to an anhydrous condition, adding dicarboxylic acid anhydride and alkali metal acetate thereto and reacting upon the cellulose ester with the dicarboxylic acid anhydride until a substantial proportion of dicarboxylic acid groups are introduced thereto.

2. A method of preparing cellulose acetate phthalate which comprises first preparing cellulose acetate by esterifying cellulose with a bath comprising acetic anhydride and sulfuric acid catalyst, hydrolyzing the cellulose acetate thus obtained in situ with aqueous acid, adding acetic anhydride to the mass to convert the same to an anhydrous condition, adding phthalic anhydride and sodium acetate thereto the latter being in an amount which will neutralize any inorganic acid which may be present and then esterifying the cellulose acetate therein until a substantial proportion of phthalic acid groups are introduced.

3. A method of preparing cellulose acetate phthalate which comprises first preparing cellulose acetate by esterifying cellulose with a bath comprising acetic anhydride and sulfuric acid catalyst, hydrolyzing the cellulose acetate thus obtained while it is still in solution, with aqueous acetic acid, adding acetic anhydride to the mass to convert the same to an anhydrous condition, adding phthalic anhydride and sodium acetate, the latter in an amount of .1–3 parts excess over that necessary to neutralize the sulfuric acid present and then esterifying the cellulose acetate with the phthalic anhydride until a substantial proportion of phthalic acid groups are introduced.

References Cited in the file of this patent

UNITED STATES PATENTS

| | | |
|---|---|---|
| 2,126,460 | Genung | Aug. 9, 1938 |
| 2,285,536 | Seymour et al. | June 9, 1952 |